(12) United States Patent
Zafiroglu et al.

(10) Patent No.: US 9,449,488 B2
(45) Date of Patent: Sep. 20, 2016

(54) OBJECT RECOGNITION AND NOTIFICATION

(75) Inventors: Alexandra Zafiroglu, Portland, OR (US); Jennifer Healey, San Jose, CA (US); David L. Graumann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 13/977,592

(22) PCT Filed: Dec. 29, 2011

(86) PCT No.: PCT/US2011/067835
§ 371 (c)(1),
(2), (4) Date: Feb. 5, 2015

(87) PCT Pub. No.: WO2013/101057
PCT Pub. Date: Jul. 4, 2013

(65) Prior Publication Data
US 2015/0137985 A1    May 21, 2015

(51) Int. Cl.
| G08B 21/24 | (2006.01) |
|---|---|
| G08B 13/14 | (2006.01) |
| B60R 16/02 | (2006.01) |
| G06K 7/00 | (2006.01) |
| G06K 7/10 | (2006.01) |
| G06K 9/00 | (2006.01) |
| G06K 9/34 | (2006.01) |

(52) U.S. Cl.
CPC .............. *G08B 21/24* (2013.01); *B60R 16/02* (2013.01); *G06K 7/0008* (2013.01); *G06K 7/10297* (2013.01); *G06K 7/10425* (2013.01); *G06K 9/00832* (2013.01); *G06K 9/342* (2013.01)

(58) Field of Classification Search
CPC ...... G08B 21/24; G08B 13/14; B60R 16/02; G06K 9/00832; G06K 7/10425; G06K 7/0008
USPC ............. 340/505, 506, 539.1, 539.11, 572.1, 340/686.1, 10.1, 10.3, 10.4, 10.42
See application file for complete search history.

(56) References Cited

U.S. PATENT DOCUMENTS

| 5,829,782 A | 11/1998 | Breed et al. |
|---|---|---|
| 7,880,613 B1 * | 2/2011 | Maeng ................. G06K 7/0008 340/10.42 |

(Continued)

FOREIGN PATENT DOCUMENTS

| KR | 10-2010-0130103 A | 12/2010 |
|---|---|---|
| WO | 2013/101057 A1 | 7/2013 |

OTHER PUBLICATIONS

International Search Report and Written Opinion received for PCT Application No. PCT/US2011/067835, mailed on Sep. 19, 2012, 20 pages.

(Continued)

*Primary Examiner* — Hung T Nguyen
(74) *Attorney, Agent, or Firm* — Sutherland Asbill & Brennan LLP

(57) ABSTRACT

Methods, systems, and apparatus are provided for determining the presence or absence of an object within a vehicle based on sensor signals and selectively providing notification to a user of the same.

25 Claims, 7 Drawing Sheets

(56) References Cited

U.S. PATENT DOCUMENTS

2008/0018475 A1    1/2008  Breed et al.
2008/0157966 A1    7/2008  Danvir et al.
2010/0188226 A1*   7/2010  Seder .................... G08B 21/24
                                                        340/572.1

OTHER PUBLICATIONS

International Preliminary Report on Patentability and Written Opinion received for PCT Patent Application No. PCT/US2011/067835, mailed on Jul. 10, 2014, 7 Pages.

* cited by examiner

OBJECT RECOGNITION AND NOTIFICATION

TECHNICAL FIELD

This invention generally relates to methods, systems, and apparatus for object recognition, and more particularly, notification based upon recognizing the object.

BACKGROUND

Drivers of vehicles may transport personal belongings in the vehicle with them to various locations. For example, when a driver is driving to work in a car, he/she may be carrying a variety of personal belongings, such as a purse, a briefcase, a laptop computer, a mobile telephone, or the like. Additionally, people often carry different items on different days. For example, one may carry a laptop computer to work only on Monday mornings and then bring it home from work on Friday evenings. Similarly, one may carry a gym bag only on the days that he/she goes to the gym. Therefore, oftentimes, the items that one may transport in his/her vehicle may fit general temporal patterns. The patterns may manifest themselves in several ways. For example, one may carry a mobile phone every time he/she enters or leaves a vehicle. Other items, such as a briefcase, may enter the vehicle twice on each weekday, for example, on the way to and from work. Other items may have yet a different temporal pattern of entering or leaving the vehicle. For example, one may carry a gym bag twice per week, such as on the days that the individual works out.

People also often forget to place their personal belongings with them into the vehicle when they need them. For example, one may forget to bring his/her mobile phone when entering a vehicle to drive to work. Forgetfulness may also cause one to leave belongings needed when exiting the vehicle. For example, one may unintentionally leave his/her briefcase in the vehicle upon exiting. Forgetting to bring items into a vehicle or take items out of the vehicle may cause inconvenience to the users or owners of the items.

A vehicle may also serve as a place to temporarily store items. One may, for example, store a purse in the trunk of the vehicle or store valuable items in the glove compartment. When items are stored within the vehicle, they may be prone to loss by theft. Theft may cause an inconvenience to the owner of the items. Furthermore, some items may be expensive to replace or may not be replaceable at all.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Embodiments of the invention are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure provide systems, methods, and apparatus for identifying objects within a vehicle and further providing notification to a user based on the identification. The objects may be personal belongings, such a purse, a mobile phone, a briefcase, a duffle bag, a diaper bag, or the like. The object may be identified by utilizing radio frequency identification (RFID) tags disposed on items and read by an RFID interrogator. The object may also be identified by utilizing an image sensor and comparing signals from the image sensor to an object model. In some cases, the object model may be a time varying object model. In other cases, the object model may be updatable. Upon identifying the presence or absence of an object, a determination is made as to whether a notification should be provided to a user of the system. The notification may be determined by utilizing a usage model. The usage model may indicate objects that are carried into or out of a vehicle under various conditions and times. For example, the usage model may be a temporal model. The usage model may further incorporate information related to when a particular item is present within the vehicle and/or when the particular item is not present in the vehicle. In one aspect, the usage model may be updatable over time. If it is determined that a notification is required, then notification may be sent to a display as a video signal, to speakers as an audio signal, to a mobile phone as a text message, to an email address as an email, or the like.

Example embodiments of the invention will now be described with reference to the accompanying figures.

Figure 1:
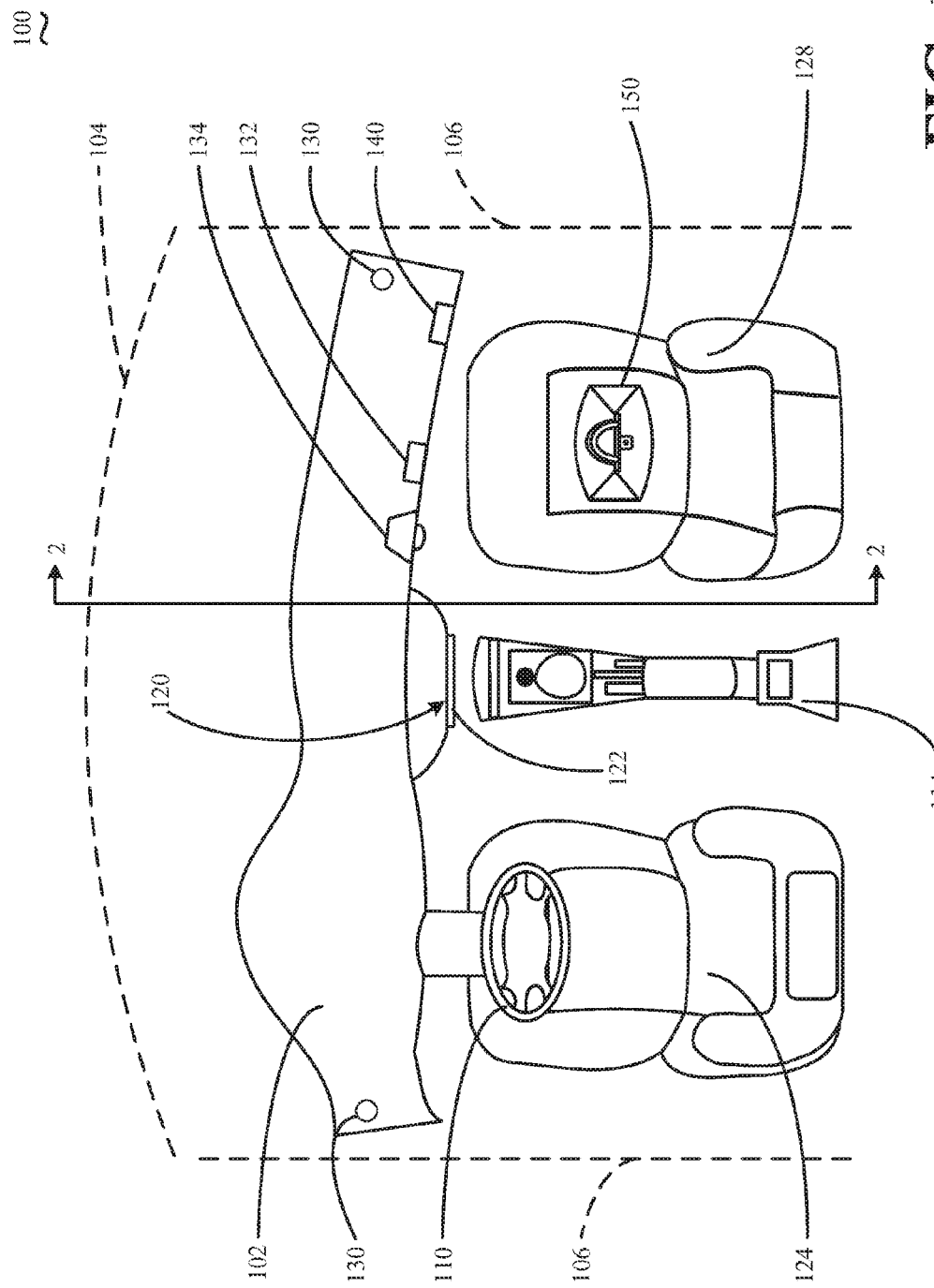
FIG. 1 is a simplified schematic top-down view illustrating an example vehicle cockpit with object identification elements that can be operated in accordance with embodiments of the disclosure.
Figure 2:
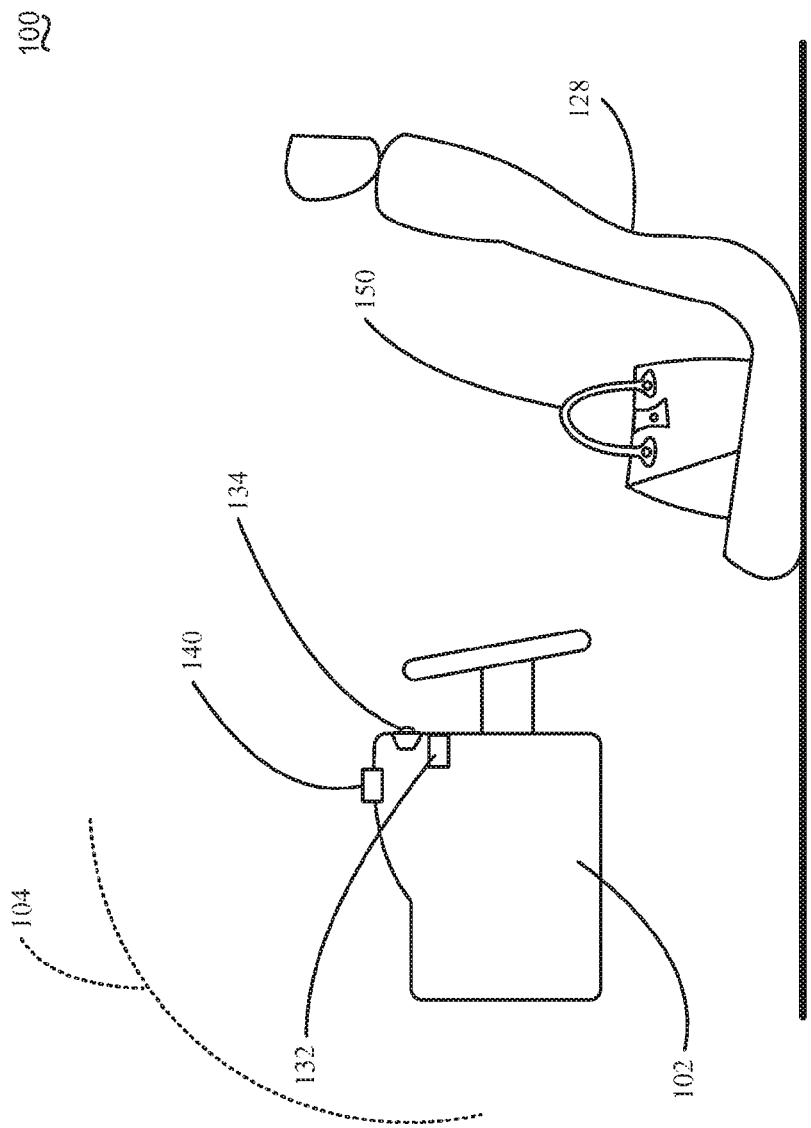
FIG. 2 is a simplified schematic side-view illustrating the example vehicle cockpit of FIG. 1 with object identification elements that can be operated in accordance with embodiments of the disclosure.

Referring now to FIGS. 1 and 2, a vehicle cockpit 100 may include a dashboard 102, a windshield 104, side windows 106, a steering wheel 110, a center armrest 114, a driver seat 124, and a passenger seat 128. Extending out from the dashboard 102 may be a control panel, such as a center console 120. The center console 120 may further include a display screen 122 for displaying a video output that may be viewed by a user, such as the driver of the vehicle. The vehicle cockpit 100 may also include one or more speakers 130. Further, the vehicle cockpit 100 may include an illumination source 132, an image sensor 134, and optionally a radio frequency identification (RFID) interrogator 140. The vehicle cockpit 100 may also have an object 150, depicted here as a purse.

For the purposes of this discussion, the vehicle can include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, or any other suitable vehicle having a relatively closed cockpit. However, it will be appreciated that embodiments of the disclosure may also be utilized in other environments where identification of objects is needed.

While the one or more speakers 130 are depicted on the dashboard 102 for illustrative purposes, it should be appreciated that the speakers 130 may be provided anywhere within the vehicle, including on any one of the steering wheel 110, the seats 124 and 128, the center armrest 114, the center console 120, the doors (not shown), or the like. The one or more speakers 130 may be of any known type including, but not limited to, a cone diaphragm-type speaker, a dynamic speaker, a piezoelectric speaker, a full-range speaker, a subwoofer, a woofer, a tweeter, or combinations thereof. In one aspect, the one or more speakers 130 may receive speaker signals and, based upon the speaker signals, provide sound corresponding to the speaker signals. In another aspect, the sounds generated by the one or more speakers 130 may be heard by one or more users, such as the driver of the vehicle.

The illumination source 132 and the image sensor 134 may be provided on the dashboard 102, as depicted, or any suitable location within the interior of the vehicle. For example, the illumination source 132 and the image sensor 134 may be located on the steering wheel 110, the seats 124 and 128, the center armrest 114, the center console 120, the doors (not shown), or the like. It should also be appreciated that although a single illumination source 132 and image sensor 134 are depicted, there may be any number of illumination sources and any number of image sensors. For example, there may be two illumination sources and three image sensors. As a further example, an image sensor may be provided on the dashboard 102, and another image sensor may be provided on the center armrest 114. Further yet, the illumination source may be provided in other areas of the vehicle other than the vehicle cockpit 100, such as a trunk of the vehicle, as will be discussed in reference to FIG. 4.

The illumination source 132 may be an emitter of electromagnetic radiation, such as a light emitter providing optical output at one or more wavelengths. For example, the wavelengths may be in the infrared region of the spectrum and therefore may not be visible to an occupant of the vehicle cockpit 100. Alternatively, the wavelength may be in the near-ultraviolet (UV) range. As a further alternative, the wavelength of the illumination source 132 may be provided in the visible range of about 380 nm to about 750 nm. The illumination source 132 may be any known radiation source including, but not limited to, a light-emitting diode (LED), an incandescent source, a candescent source, a resistive filament-based light bulb, a gas discharge-based bulb, a diode laser, a quantum well laser, a solid state laser, a gas laser, or combinations thereof.

The illumination source 132 may further include any variety of optical elements, such as any combination of lenses, reflectors, or waveguides. In certain aspects, the optical elements may be able to provide a radiation distribution that is relatively dispersed. For example, the optical element may include a lens that provides a relatively wide angle optical output from a relatively point-like optical source. In certain further embodiments, the illumination source 132 may include mechanical elements that enable directing the radiation in one or more directions. In one aspect, the directed illumination may be controlled by control signals provided to the illumination source 132. In certain embodiments, the illumination source may be selectively energized by, for example, selectively providing power to the illumination source 132. Therefore, the illumination source 132 may consume power only when illumination from the illumination source 132 is required.

The image sensor 134 may be any known device that converts an optical image or optical input to an electronic signal. The image sensor 134 may be of any suitable variety including a charge-coupled device (CCD), complementary metal oxide semiconductor (CMOS) sensors, or the like. The image sensor 134 may be of any pixel count and aspect ratio. Furthermore, the image sensor 134 may be sensitive to any frequency of radiation, including infrared, visible, or near-UV. In one aspect, the image sensor 134 has a frequency range of sensitivity that includes the frequency of the illumination source 132.

Figure 3:
FIG. 3 is a simplified schematic view illustrating of an example personal object that can be detected by systems and methods in accordance with embodiments of the disclosure.

The RFID interrogator 140 may be any variety of suitable devices that can be used to read information from RFID tags. The example object 150 in the form of a purse, as illustrated in FIG. 3, may optionally include an RFID tag 154 embedded thereon to be read by the RFID interrogator 140. The RFID tag 154 may be interrogated by the RFID interrogator 140 to determine the presence of the object 150 within the vehicle. The RFID tag 154 may be uniquely encoded relative to other RFID tags that may be associated with other objects in the vicinity of the RFID interrogator 140. In certain embodiments, the RFID tag 154 may be configured to communicate with the RFID interrogator 140 from several meters away. The RFID tag 154 may be of any suitable variety, including an active tag, a passive tag, a battery-powered tag, a battery-less tag, or the like. In one aspect, the RFID tag 154 may include a receiver (not shown) for receiving an interrogation signal from the RFID interrogator 140 and a transmitter (not shown) for transmitting a signal responsive to the interrogation signal. The RFID tag 154 may be embedded in the object 150 by the manufacturer of the object 150 in certain cases. Alternatively, the RFID tag 154 may be embedded in the object after the object has been procured by the owner or user of the object 150.

Figure 4:
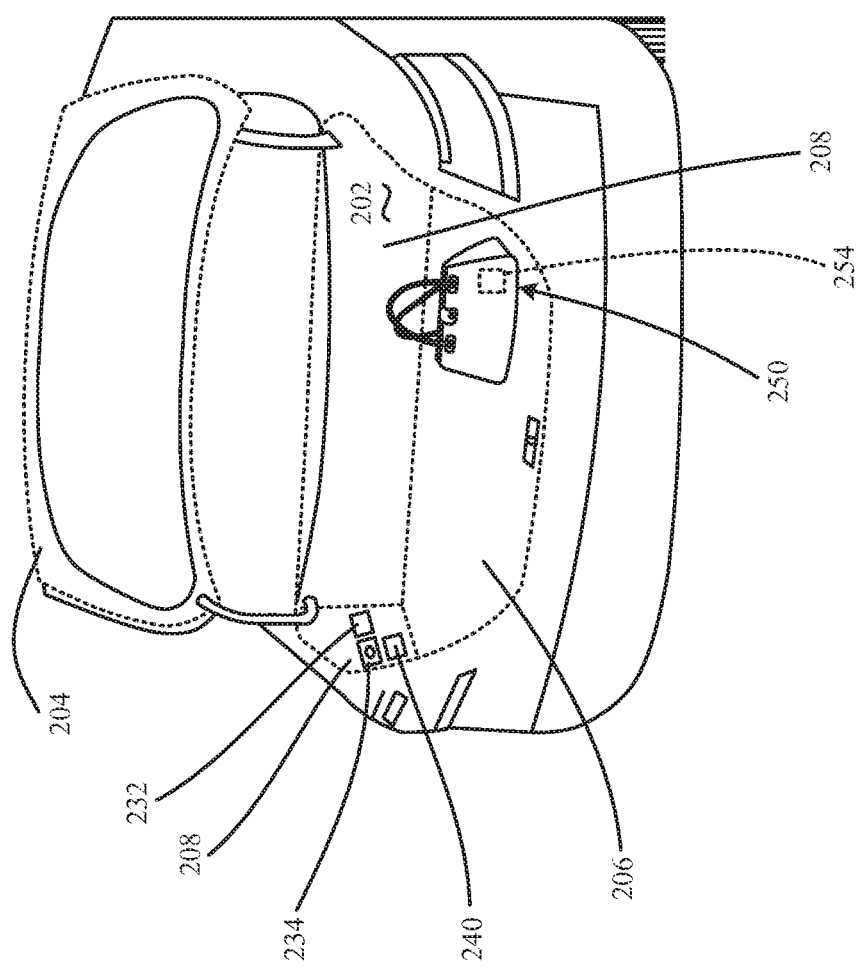
FIG. 4 is a simplified view of an example trunk of a vehicle with object identification elements that can be operated in accordance with embodiments of the disclosure.

FIG. 4 illustrates another embodiment of example elements to determine the presence of objects within a trunk 202 of the vehicle, enclosed by a trunk lid 204, a trunk floor 206, and trunk walls 208. As in the vehicle cockpit 100, as depicted in FIGS. 1 and 2, the trunk 202 may have an illumination source 232, an image sensor 234, and optionally an RFID interrogator 240. At least one object 250 may further be placed within the trunk 200 of the vehicle. The object 250 may optionally have an RFID tag 254 associated therewith.

While the illumination source 232, the image sensor 234, and the RFID interrogator 240 are depicted as mounted to one wall 208 of the trunk 202, each of the object identification elements 232, 234, and 240 may be provided in any suitable location within the trunk 202. For example, the object identification elements 232, 234, and 240 may be mounted on any of the walls 208, the trunk floor 206, or the trunk lid 204. Additionally, any number of illumination sources, image sensors, or RFID interrogators may be provided on the interior of the trunk 202. For example, two illumination sources and two image sensors may be provided in the trunk 202 to achieve illumination and imaging of a greater percentage of the overall volume of the trunk 202.

Figure 5:
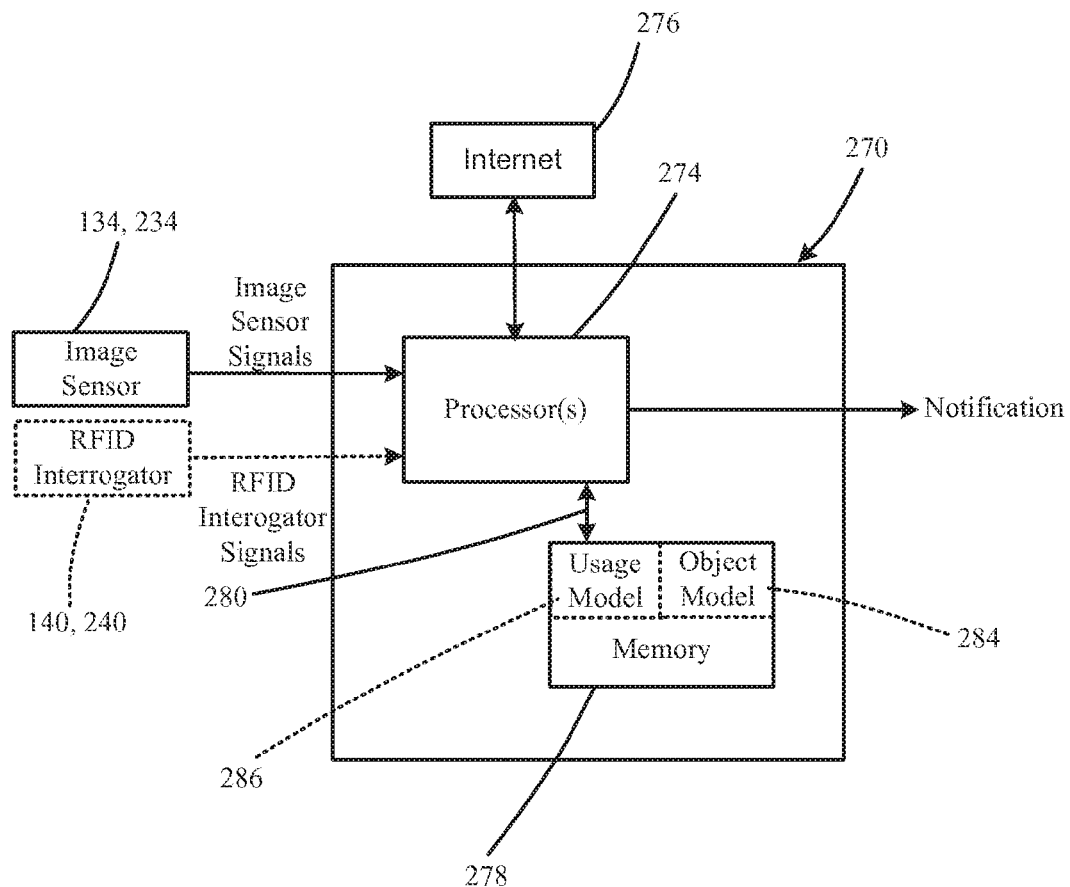
FIG. 5 is a simplified block diagram illustrating an example system for receiving sensor input from object identification elements and selectively providing notification associated with an object in accordance with embodiments of the disclosure.

Referring now to FIG. 5, an example system 270 for receiving image sensor signals from the image sensors 134 and 234 and, optionally, RFID interrogator signals from the RFID interrogators 140 and 240, and selectively providing notification messages is illustrated. The system 270 may include one or more processors 274 communicatively coupled to an electronic memory 278 via a communications link 280. The electronic memory 278 may have object model 284 and usage model 286 stored thereon and accessible by the one or more processors 274 via the communications link 280. The one or more processors 274 may also, optionally, be communicatively coupled to the internet 276.

The one or more processors 274 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The system 270 may also include a chipset (not shown) for controlling communications between the one or more processors 274 and one or more of the other components of the system 270. In certain embodiments, the system 270 may be based on an Intel® Architecture system and the one or more processors 274 and chipset may be from a family of Intel® processors and chipsets, such as the Intel® Atom® processor family. The one or more processors 274 may also include one or more application-specific integrated circuits (ASICs) or application-specific standard products (ASSPs) for handling specific data processing functions or tasks.

The memory 278 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

In certain embodiments, the one or more processors 274 may be part of an in-vehicle infotainment (IVI) system. In other embodiments, the one or more processors 274 may be dedicated to the system 270 for providing component control signals. Therefore, in such embodiments, the system 270 is separate from the IVI system. However, the system 270 may optionally communicate with the IVI system of the vehicle.

In certain embodiments, the one or more processors 274 may receive RFID interrogator signals from an RFID interrogator, such as RFID interrogators 140 and 240, and interpret the RFID interrogator signals to determine an object, such as objects 150 and 250, that may be in the vehicle. The mechanism for identifying the object may entail determining from the RFID interrogator signals any RFID tag, such as tags 154 and 254, identifications, such as an RFID code, and then determining if the read codes correspond to the objects as stored in the object model 284. In this case, the object model 284 may be a lookup table that provides a pairing of RFID information with the corresponding respective object. As a nonlimiting example, a user may have a purse with a particular RFID code, a mobile telephone with another RFID code, and a backpack with yet another RFID code, and the object model 284 may pair each of the codes to the respective object. In other words, the user may have multiple objects each embedded with RFID tags where each of the RFID tags may have a unique code associated therewith. Therefore, if the user carries the backpack into the interior of the vehicle, the RFID interrogator 140 may read the RFID tag associated with the backpack and provide an RFID signal indicative of the code associated with the RFID tag of the backpack to the one or more processors 274. The one or more processors 274, in turn, may process the RFID signal received to determine the code and then compare the code to all known codes as stored in the object model 284. If the received code matches one of the codes stored in the object model 284, then the one or more processors 274 may be able to ascertain one of the objects within the vehicle cockpit 100.

Once the one or more processors 274 determine that a particular object is within the vehicle, for example within the vehicle cockpit 100 or the trunk 202, the one or more processors 274 may optionally update an object log. In one aspect, the object log may provide a current update of all identified objects within the vehicle. In other words, the object log may change over time as a objects are brought into the vehicle or taken out of the vehicle. The object log may be stored on registers (not shown) of the one or more processors 274 or on the electronic memory 278. Therefore, accessing the object log, such as by the one or more processors 274, may provide a current inventory of objects that are in the vehicle. Furthermore, the object log may also provide historical information with regard to objects being brought into the vehicle and taken out of the vehicle. Further, the object log may extend back in time for any temporal length. For example, the object log may extend back for three months providing information on all objects that have been brought into the vehicle and taken out of the vehicle. In certain embodiments, the object log may also provide information on where the objects were placed. For example, the object log may store information on whether the object was placed within the vehicle cockpit 100 or the trunk 202. Such information, may be available based on which RFID interrogator provided a signal indicative of the logged object. For example, if the RFID interrogator 140 provided the signal, then the object may be logged at a particular time as being brought into the vehicle cockpit 100 of the vehicle. If however, the RFID interrogator 240 provided the signal, then the object may be logged at a particular time as being brought into the trunk 202 of the vehicle. For purposes of logging the objects, information on time may be provided from the one or more processors 274 or any other suitable source.

If the one or more processors 274 determine that particular objects 150 and 250 have been brought into the vehicle, then the RFID interrogators 140 and 240 may periodically interrogate the RFID tags 154 and 254 corresponding to the objects 150 and 250, respectively. By periodically interrogating the RFID tags 154 and 254 and providing the resulting RFID signals to the one or more processors 274, the one or more processors 274 may be able to ascertain if the objects are still in the vehicle. If the objects are still in the vehicle, the one or more processors 274 may not take any further actions. If, however, at a certain time the RFID signals provided to the one or more processors 274 indicate that objects 150 and 250 are no longer contained in the vehicle, then the one or more processors 274 may determine that the object 150 and 250 have been removed from the vehicle. The one or more processors 274 may further update the object log based on the removal of the objects 150 and

250. In other words, the object log may reflect the approximate time at which the objects 150 and 250 were removed from the vehicle.

In one aspect, the object model 284 for RFID identification of objects may be generated by providing to the one or more processors 274 information on the pairing of RFID codes to objects of interest to the user of the vehicle. Based on the information provided to the one or more processors 274, the lookup table may be generated and stored on the electronic memory 278 as the object model 284. In one case, a file may be downloaded to the one or more processors 278 to provide information on the pairing of RFID codes and objects. In another case, the object model 284 may be generated by a training process, wherein the user of the vehicle may place the system 270 in a training mode where the RFID interrogators 140 and 240 are made to read each of the RFID tags 154 and 254 corresponding to each of the users objects 150 and 250. As the tags are read, the user may provide a description of the objects 150 and 250 corresponding to each of the codes that are read via a user interface, such as a keyboard on the center console 120 or by voice recognition.

Still referring to FIG. 5, an illustrative object recognition based on image sensor signals from the image sensors 134 and 234 is now discussed. The one or more processors 274 may receive image sensor signals on a periodic basis and, based upon the signals, may generate an indication of the presence or absence of one or more objects within the vehicle. The image sensor signals may correspond to an image provided from the interior of the vehicle, such as from the vehicle cockpit 100 or the trunk 202. The image sensor signals may be processed by the one or more processors 274 to determine if an object exists and what the object is.

The one or more processors 274 may perform mathematical manipulations of the constituent pixels of the image corresponding to the image sensor signals. The mathematical manipulations may further involve a baseline image. For example, the mathematical manipulations may involve a pixel-by-pixel subtraction of the baseline image from the image corresponding to the image sensor signals. In one aspect, the baseline image may be an image of a particular location within the vehicle without the presence of an object.

This concept can be better illustrated by way of a non-limiting example. Consider that the object 150 is on the seat 128 within the vehicle cockpit 100, as depicted in FIG. 1. In this case, the image sensor signals provided to the one or more processors 274 would correspond to an image where the object 150 is on the seat 128. The one or more processors 274 may perform a pixel-by-pixel subtraction of a baseline image from the image received from the image sensor 134. The baseline image in this case, may be an image of the seat 128 without any objects placed thereon. Therefore, by subtracting such a baseline image from the image received corresponding to the object 150 placed on the seat 128, an image may be generated of just the object 150 without surrounding elements, such as the seat 128. Therefore, an image of only the object 150 may be compared to images of objects stored in the object model 284 on the electronic memory 278.

It should be noted that unlike the case of RFID tag based object identification, with image based object recognition, the object model 284 may include a number of images corresponding to objects that may be recognized by the system 270. Each object that may be identified by the system 270 may have images associated therewith from various angles and perspectives provided in the object model 284. For example, the object 150 may have a plurality of images associated therewith within the object model 284, where each image may be from a different angle and different perspectives of the object 150. A number of images may be provided in the object model 284 with the object sitting on its base. Other images may be provided in the object model 284 with the object 150 lying on its side. Other images may be provided in the object model 284 showing the straps of the object 150 and various positions. By providing a large number of images, the one or more processors 274 may perform an image-to-image comparison to more definitively identify the object 150. The images associated with a particular object 150 may therefore include information associated with the general shape, size, color, surface texture, and the like of the object 150.

In certain embodiments, the object model 284 for a particular object 150 may further have an aging element associated therewith. The aging element may provide information on the degradation of the object 150 overtime and the resulting images may show the degradation. For example, the object 150, depicted as a purse, may degrade over time. As the purse is used, its stiffness may decrease and thereby its shape may change. Furthermore, as the external surface wears, the surface texture of the object 150 may also change. Therefore, the aging element associated with images of a particular object within the object model 284 may allow for the one or more processors 274 to properly identify an object that has wear as a result of age and usage.

In other embodiments, the object model 284 for a particular object 150 may be periodically updated as the object is observed within the vehicle. In other words, once the system 270 observes the object 150, the system 270 may identify changes between the current image of the object 150 at a particular angle and perspective compared to the image stored in the object model 284 and being used for comparison purposes. If the one or more processors 274 identify changes between the image stored in the object model 284 and a current image as received via the image sensor signal, then the one or more processors 274 may update the object model 284 using the current image of the object 150 at a particular angle and perspective. The one or more processors 274 may further update other images associated with the object 150 in the object model based in part on observed age and usage-related wear from one particular angle and perspective. The object model 284 for a particular object 150 may further be updated based on items that may be attached to the object 150. For example, in the case of the purse, if the user puts a particular pin or sticker on the external surface of the purse, the one or more processors 274 may still be able to identify the purse based on images in the object model 284. However, to improve the robustness of the mechanism for identification of the purse, the one or more processors 274 may add additional images of the purse with the pin or sticker attached thereto. As an alternative, the one or more processors 274 may replace pre-existing images and the object model 284 with new images of the purse consistent with the attachment of the pin or sticker. Therefore, it may be appreciated, that the one or more processors 274 may update the object model 284 based upon current image sensor signals to provide greater accuracy and precision of object identification using the object model 284. While examples have been illustrated where the object model 284 is updated by the one or more processors 274 based upon aging or providing attachments to a particular object, the object model 284 may be updated for any reason that may increase system 270 robustness in identifying a particular object. For example, there may be a particular number of comparison images of a corresponding object in the object model 284 and various angles and perspectives. However, the one or more processors 274 may add additional images corresponding to viewing angles and perspectives that are not available in the current object model 284.

In certain embodiments, the object model 284 for a particular object, including images and aging elements, may be obtained by the user from the manufacturer of the object. For example, if the user purchases a purse from a particular manufacturer, the manufacturer may provide images of the purse and indications of how the purse is expected to wear with age and usage, and such information can be uploaded to the system 270 and stored as the object model 284 of the particular object in the electronic memory 278. In certain other embodiments, the object model 284 for a particular object may be obtained from the retailer of the object. For example, a user may obtain the object model 284 of a briefcase from the store from which the briefcase was purchased. In yet other embodiments, the object model for a particular object may be obtained from a service provider associated with that object. For example, the object model 284 for a mobile telephone may be obtained from the entity that provides cellular service. Consistent with other embodiments, the object model 284 may be created by the user using any type of imaging system, including the image sensors 134 and 234. For example, the user may "show" the object to the image sensors 134 and 234 at various angles and perspectives, and the one or more processors may extract and render the object from various positions and generate multiple images therefrom to generate the object model 284 of the object.

It should also be noted that mathematical manipulations associated with the images received from the image sensors 134 and 234 may entail manipulations other than pixel-by-pixel subtraction of a baseline image. For example, the images received from the image sensor 134 and 234 may first be resized prior to pixel-by-pixel subtraction of a baseline image. This may be done, because the distance between the object and the image sensors 134 and 234 may be variable. For example, in the depiction of FIG. 1, where the object is placed on the seat 128, it may be appreciated that the seat 128 can move back and forth within the vehicle cockpit 100, thereby changing the distance between the seat 128, as well as, the object 150 from the image sensor 134. Therefore, performing a baseline image subtraction using a baseline image at a particular distance between the seat 128 and the image sensor 134 may not provide the desired result of isolating the image of the object 150. As a result, a resizing operation may be used to resize either the baseline image or the real time image provided by the image sensor 134. In one aspect, the resizing operation may be performed by comparing the size of a physical marker within the vehicle cockpit 100.

In certain embodiments, if the one or more processors 274 determine that the images provided by the image sensors 134 and 234 are either too bright or too dark, the one or more processors 274 may optionally provide a control signal to the elimination sources 132 and 232 to adjust the level of illumination to provide for images that may generate a more accurate assessment of objects that are in the vehicle.

As described above with reference to RFID based identification of objects, when an object is identified using an image sensor signals, an object log may optionally be updated. The updating may reflect information on the presence or the absence of a particular object. Furthermore the object log may timestamp when an object is brought into the vehicle and when an object is taken out of the vehicle.

In the case of both the RFID based identification of objects, as well as in the case of the image sensor based identification of objects, it should be understood that there may be none, one, or multiple identified objects within the vehicle. Additionally, some objects may be identified within the vehicle cockpit 100, and other objects may be identified within the trunk 202. Further yet, any number of objects may be identified within other portions of the vehicle.

Continuing on with the case of the one or more processors 274 receiving an RFID interrogator signal or image sensor signal indicative of an object, once the objects 150 and 250 are identified and the object log is optionally updated, the one or more processors 274 may determine if a notification to the user should be generated. The notification may be triggered by at least one of bringing an object into the vehicle, taking an object out of the vehicle, the presence of an object within the vehicle, or the absence of an object within the vehicle. In each of these cases, the notification may be generated by the one or more processors 274 if an expected condition related to objects is not observed.

In the case of bringing an object into the vehicle, if the one or more processors 274 expect an object to be brought into the vehicle and that object is not detected as expected based on the usage model 286, then the one or more processors 274 may generate a notification. As an example, consider a user who takes a laptop bag into the vehicle every weekday morning on the way to work. If on a particular morning, the laptop bag is not detected within the vehicle, then the one or more processors 274 may generate a notification providing an indication of the missing item to the user. Therefore, the system 270 may provide reminders to the user to bring items into the vehicle that the user may need.

In the case of taking an object out of the vehicle, if the one or more processors 274 expect an object to be taken out of the vehicle and that object is detected within the vehicle, then the one or more processors 274 may generate a notification. As an example, consider that a user always takes a mobile phone when he/she leaves the vehicle and this information is indicated in the usage model 286. If on a particular occasion the user leaves the vehicle but a mobile phone is detected within the vehicle, then the one or more processors 274 may generate an notification indicating the mobile phone is still in the vehicle. Therefore, the system 270 may provide reminders to the user to take his/her needed belongings when exiting the vehicle.

In the case of detecting the presence of an object within the vehicle, if the one or more processors 274 expect an object to not be within the vehicle and that object is detected within the vehicle at a particular time, then the one or more processors 274 may generate an notification of the object being inside the vehicle. As an example, consider that the user does not leave her purse in the vehicle after a particular time, such as in the middle of the night. If the system 270 detects the purse within the vehicle during the particular time that the purse is not normally left in the vehicle then the one or more processors may generate a notification to let the user know that the purse is in the vehicle. Therefore the system 270 may help in locating items that are accidentally left in the vehicle.

In the case of detecting the absence of an object within the vehicle, if the one or more processors 274 expect an object to be within the vehicle and that object is not detected within the vehicle at a particular time, then the one or more processors 274 may generate a notification that the object is not inside the vehicle. For example, consider that the user leaves his/her stand-alone global positioning satellite (GPS) system in the vehicle at all times. If the system 270 does not detect the GPS system within the vehicle, then the one or more processors 274 may generate a notification indicating to the user at the GPS system is no longer within the vehicle. Therefore, the system 270 may provide an indication of potential theft or loss of objects.

The usage model 286 used by the one or more processors 274 to ascertain whether a notification should be generated may provide information related to the presence of a particular object within the vehicle at particular times. In other words, the usage model 286 may be a registry of items expected within the vehicle at particular times. Additionally, the usage model 286 may also include information on when particular objects are brought into the vehicle and are taken out of the vehicle. Therefore, when the one or more processors 274 either detect an object within the vehicle or detect the absence of the object within the vehicle, the one or more processors 274 may access the usage model 286 to determine if the presence or absence of a particular object is consistent with the usage model 286.

In certain embodiments, the usage model 286 may be temporal models. For example, the usage model 286 may indicate that a particular user may carry his/her briefcase to work in the morning on non-holiday weekdays. Such information may be encoded in the usage model 286 as particular times in the morning when the presence of the briefcase is expected in the vehicle. Alternatively, the information may be encoded in the usage model 286 as an expected event where the briefcase is brought into the vehicle during a particular range of times on non-holiday weekday mornings. As a further alternative, the information may be encoded in the usage model 286 as an expected event where the briefcase is brought into the vehicle prior to starting the vehicle for the first time on any particular non-holiday weekday.

It may be appreciated, that the usage model 286 may provide a temporal pattern associated with the presence of each of one or more objects. The temporal pattern associated with each object may be different from other objects. In other words, the temporal frequency may be different for different objects. For example, certain objects may be expected within the vehicle on a daily basis, others on a weekly basis, and yet others on a monthly basis. Some objects may be expected within the vehicle on particular days of the week. For example, a user may go running on Mondays, Wednesdays, and Fridays and therefore the usage model 286 may indicate that running shoes are expected in the vehicle on Mondays, Wednesdays, and Fridays. Other objects may be expected within the vehicle at all times.

In certain other embodiments, the usage model 286 may take other factors into account other than just temporal patterns associated with objects. For example, the usage model 286 or the one or more processors 274 may have access to weather, safety, or environmental conditions and may set object expectation information based thereon. For example, the usage model 286 may indicate that an umbrella may be expected within the vehicle on days when the weather forecast indicates that rain is likely. Therefore, when the one or more processors 274, compare an inventory of objects within the vehicle with the usage model 286, on days when rain is expected, a notification may be generated if the umbrella is not detected within the vehicle. As another example, the usage model 286 may indicate that a jacket may be expected within the vehicle on days when the temperature is expected to drop below a predetermined threshold.

In yet other embodiments, the usage model 286 may provide a linkage of object information. In other words, certain objects may be expected within the vehicle if other objects are detected within the vehicle. For example, if a tennis racket is observed in the vehicle, then the object model 286 may indicate that tennis balls and a gym bag might also be expected within the vehicle.

In yet further embodiments, the usage model 286 may be generated as a list of expected items. In other words, a user of the vehicle may generate a list of items that may be required in the vehicle at a particular time. In certain embodiments, this required items list may be generated by a user on an electronic device, such as a laptop computer or a tablet computer, using an application software running thereon for generating the usage model 286. The required items list may then be transferred on to the vehicle and, in particular, the memory 278 via any suitable link, such as the internet connection 276. For example, if a user wants to go on a road trip, the user may compile a list on his/her personal computer and transfer the list as a usage model 286 from his/her personal computer to his/her vehicle via the internet 276.

The notification message, when generated by the one or more processors 274 may be provided to any suitable user interface. The user interface may include the display screen 122, the one or more speakers 130, or a user's mobile telephone. Therefore, the notification may entail a message shown on the display screen 122 to indicate that an object is present and not expected or that an object is not present and is expected. The notification may further entail an audio message rendered through the one or more speakers 130 indicating via either an alarm sound or via language, that an object is present and not expected or is not present and is expected. The notification may further entail the one or more processors 274 transmitting a text message or an e-mail via appropriate channels indicating that an object is present and not expected or that an object is not present and is expected. In one aspect, the one or more processors 274 may use any combination of suitable notification mechanisms. For example, the one or more processors 274 may both send a text message to a user's mobile phone and display a message on the display screen 122 of the center console 120. In one aspect, the one or more processors 274 may provide a notification to the display screen 122 or the one or more speakers 130 when the user is in the vehicle and provide notification via e-mail or text message when the user is not in the vehicle. As an example, if an item is left inside the vehicle and it is unexpectedly removed, then the one or more processors 274 may notify the user via text message. As such, the system 270 serves as a security system, wherein the system 270 may warn of possible theft from the vehicle.

Figure 6:
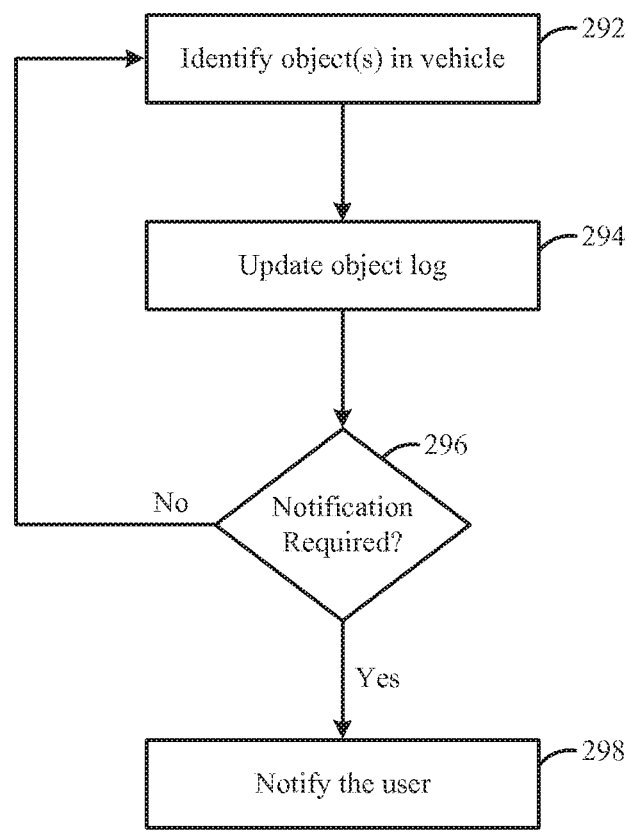
FIG. 6 is a flow diagram illustrating an example method of providing notification associated with an object in accordance with embodiments of the disclosure.

Referring now to FIG. 6, an example method 290 for notifying a user of a vehicle based upon objects detected within the vehicle is described. At block 292, one or more objects that are in the vehicle may be identified. As described in conjunction with FIG. 5, the one or more processors 274 may receive RFID signals or image sensor signals or both and use the signals in conjunction with an object model 284 stored in the electronic memory 278 to identify the one or more objects.

Once the one or more objects in the vehicle are identified at block 292, an object log may be updated at block 294. This is an optional step because in certain embodiments providing a transactional record of objects entering or leaving the vehicle may not be necessary. However, if this process 294 is used, a log may be created that can be used to identify patterns in the presence or absence of objects in the vehicle. In one aspect, the log may be useful for generating the usage model 286 associated with the one or more objects. In other words, the object log may be analyzed off-line by the one or more processors 274 to develop patterns related to particular objects and thereby provide the usage model 286 that is later used for the purposes of user notification by the one or more processors 274. In one aspect, the object log may be stored on the electronic memory 278. In another aspect, the object log may extend back in time for a predetermined temporal period.

At block 296, it is determined if a notification is required. As described with reference to FIG. 5, the notification may be determined by the one or more processors 274 by comparing the objects that are present and not present within the vehicle to an expected pattern that may be provided by the usage model 286.

If at block 296 it is determined that notification is not required, then the method 290 may return to block 292 to further observe objects in the vehicle. If, however, at block 296 it is determined that notification is required, then the one or more processors 274 will notify the user at block 298. As discussed above, the notification may be via one or more of several channels including, but not limited to, text message, e-mail message, video display, audio message, or combinations thereof.

Figure 7:
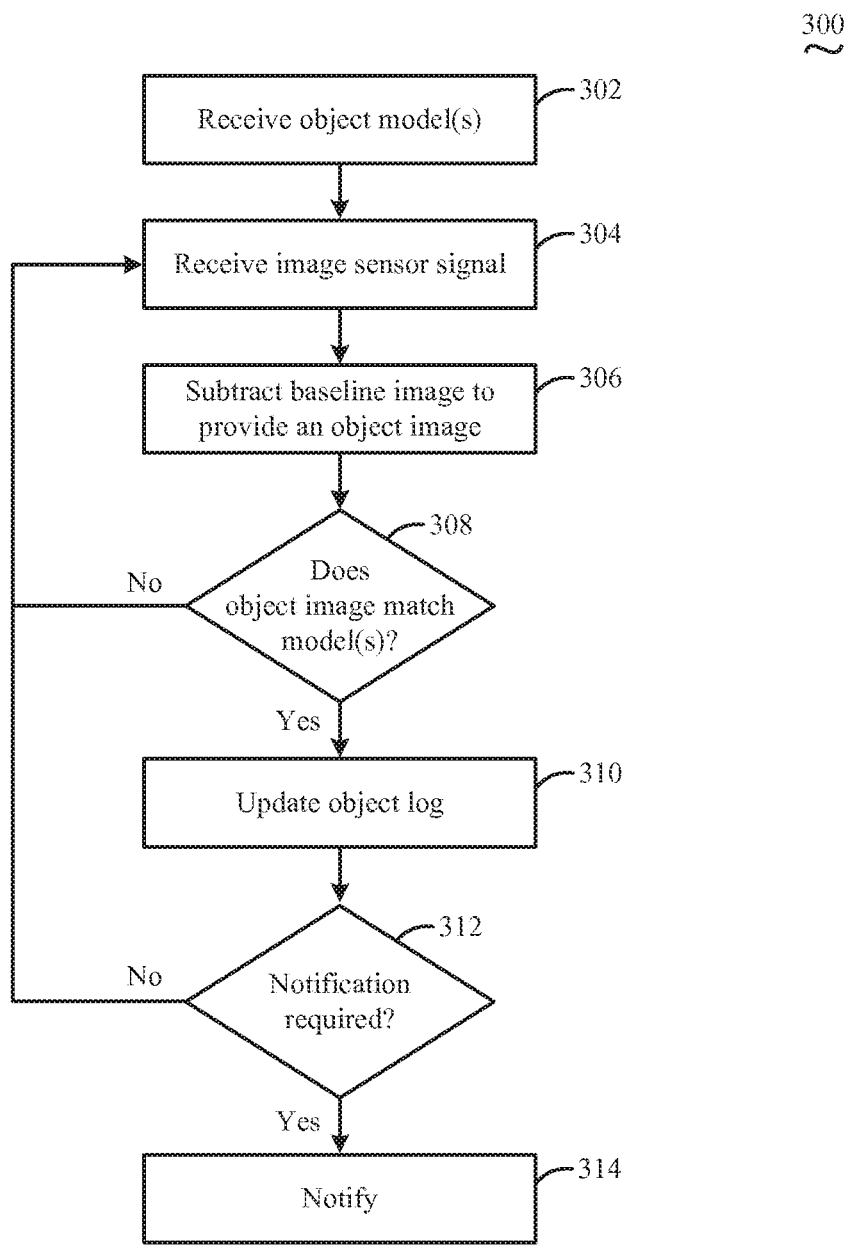
FIG. 7 is a flow diagram illustrating an example method of identifying an object and providing notification associated with the object in accordance with embodiments of the disclosure.

Referring now to FIG. 7, an example method 300 for providing object related notification to a user based on image sensor input in accordance with embodiments of the disclosure is illustrated. At block 302, one or more object models are received. As discussed with reference to FIG. 5, the object model may incorporate one or more images of an object. The images may be of the object at various angles and perspectives. The object model may further incorporate information on changes to the appearance of the object as the object wears due to aging and usage. The object model may be stored in the electronic memory 278 and may be received by the one or more processors 274 via the communications link 280.

At block 304, the image sensor signal may be received. The image sensor signal, which indicates an image of a portion of the interior of the vehicle, may be provided by the image sensors 134 and 234 to the one or more processors 274.

At block 306, the one or more processors 274 may subtract a background or baseline image to provide an object image. In one aspect, the baseline image may be an image without any objects present. The baseline image a be stored in the electronic memory 278 and accessed by the one or more processors 274 via the communications link 280. In certain embodiments, the object image may be generated by performing a pixel-by-pixel subtraction of the baseline image from the image provided by the image sensors 134 and 234.

At block 308, it is determined if the object image matches the object model. This process may be executed by comparing the object image, as generated at block 306, to one or more of the images stored in the object model 284, as received by the one or more processors 274, at block 302. When comparing the images, each of the comparisons may have a probability of a match determined based on the comparison and indication of the probability that the object image matches a particular image in the object model 284. In one aspect, a match may be declared if a particular probability of a match is greater than a predetermined threshold. Alternatively, a match may be determined for the object corresponding to the image and the object model 284 where the greatest probability of a match is determined.

If at block 308, it is determined that the object image does not match any of the images or corresponding objects in the object model 284, then the method 300 may return to block 304 to continue receiving image sensor signals. However, if the object image does match an image in the object model 284, then the one or more processors 274 may determine that the object is present in the vehicle. As a result, the one or more processors 274 may update the object log at block 310. As stated above, the object log update process may be optional.

At block 312, it is determined if a notification is required. The one or more processors 274 may determine if the presence or absence of an object in the vehicle matches previous patterns by accessing the usage model 286.

If at block 312, it is determined that notification is not required then the method 300 may return to block 304 to continue receiving image sensor signals. If, however, it is determined at block 312 that notification is required, then the user will be notified at block 314. As discussed above, the notification may be generated by the one or more processors 274 and communicated to the user via one or more of several communications mechanisms.

It should be noted that the method 300 may be modified in various ways in accordance with certain embodiments of the disclosure. For example, one or more operations of the method 300 may be eliminated or executed out of order in other embodiments of the disclosure. Additionally, other operations may be added to the method 300 in accordance with other embodiments of the disclosure.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
receiving, by one or more processors associated with a vehicle, an object model corresponding to an object;
receiving, by the one or more processors, a signal from at least one sensor associated with the vehicle;
determining, by the one or more processors, the signal corresponds to the object by generating a background subtracted signal by performing a background subtraction of the signal and comparing the background subtracted signal to the object model; and
providing, by the one or more processors, a notification based at least in part on the determining.

2. The method of claim 1, wherein the object model comprises at least one of: (i) an image of the object; (ii) a radio frequency identification; (iii) a degraded image of the object; (iv) a three dimensional wire mesh; or (v) a texture descriptor.

3. The method of claim 1, wherein the object is a personal belonging.

4. The method of claim 1, wherein the at least one sensor comprises at least one of an image sensor or a radio frequency identification interrogator.

5. The method of claim 1, wherein the signal from the at least one sensor comprises at least one of an image sensor signal or a radio frequency identification signal.

6. The method of claim 5, wherein determining if the signal corresponding to the object comprises comparing the radio frequency identification signal to the object model.

7. The method of claim 1, wherein the notification is further determined using a pattern model.

8. The method of claim 7, wherein the pattern model comprises a temporal pattern model.

9. The method of claim 7, wherein the pattern model comprises a required items list.

10. The method of claim 1, wherein the notification comprises at least one of: (i) an audible sound; (ii) a video display; (iii) a text message; (iv) an email; or (v) a visible light.

11. A vehicle comprising:
at least one sensor, the at least one sensor configured to provide a sensor signal;
an electronic memory configured to store an object model;
at least one processor configured to determine a presence of an object based at least in part on each of the sensor signals and the object model by generating a background subtracted sensor signal by performing a background subtraction of the sensor signal and comparing the background subtracted sensor signal to the object model; and
wherein the at least one processor is further configured to determine a notification based at least in part on the presence of the object.

12. The vehicle of claim 11, further comprising a user interface configured to provide a notification based in part on the determining, by the at least one processor, the notification.

13. The vehicle of claim 11, wherein the notification is further determined using a pattern model.

14. The vehicle of claim 13, wherein the pattern model comprises a temporal pattern model.

15. The vehicle of claim 13, wherein the notification comprises at least one of: (i) an audible sound; (ii) a video display; (iii) a text message; (iv) an email; or (v) a visible light.

16. The vehicle of claim 11, wherein the at least one sensor comprises at least one of an image sensor or a radio frequency identification interrogator.

17. A system comprising:
an image sensor associated with a vehicle and configured to provide an image signal;
an electronic memory, configured to store an object model;
at least one processor configured to determine a presence of an object based at least in part on the image signal and generate a notification signal by generating a background subtracted image signal by performing a background subtraction of the image signal and comparing the background subtracted image signal to the object model; and
a user interface configured to receive the notification signal and provide a notification based on the notification signal.

18. The system of claim 17, wherein the notification is further determined using a pattern model.

19. The system of claim 17, wherein the pattern model comprises a temporal pattern model.

20. The system of claim 17, wherein the notification comprises at least one of: (i) an audible sound; (ii) a video display; (iii) a text message; (iv) an email; or (v) a visible light.

21. At least one non-transitory computer readable medium comprising computer-executable instructions that, when executed by one or more processors, execute a method comprising:
receiving an object model corresponding to an object;
receiving a signal from at least one sensor;
determining that the signal corresponds to the object by generating a background subtracted signal by performing a background subtraction of the signal and comparing the background subtracted signal to the object model; and
providing a notification based at least in part on the determining if the signal corresponds to the object.

22. The at least one non-transitory computer readable medium of claim 21, wherein the signal from the at least one sensor comprises at least one of an image sensor signal or a radio frequency identification signal.

23. The at least one non-transitory computer readable medium of claim 22, wherein determining if the signal corresponding to the object comprises comparing the radio frequency identification signal to the object model.

24. The at least one computer readable medium of claim 21, wherein the notification is further determined using a pattern model.

25. The at least one non-transitory computer readable medium of claim 24, wherein the pattern model comprises a temporal pattern model.

* * * * *